Feb. 13, 1923.
J. E. MAIER ET AL.
CREAM SEPARATOR FOR MILK CONTAINERS.
FILED JUNE 26, 1922.
1,445,527.
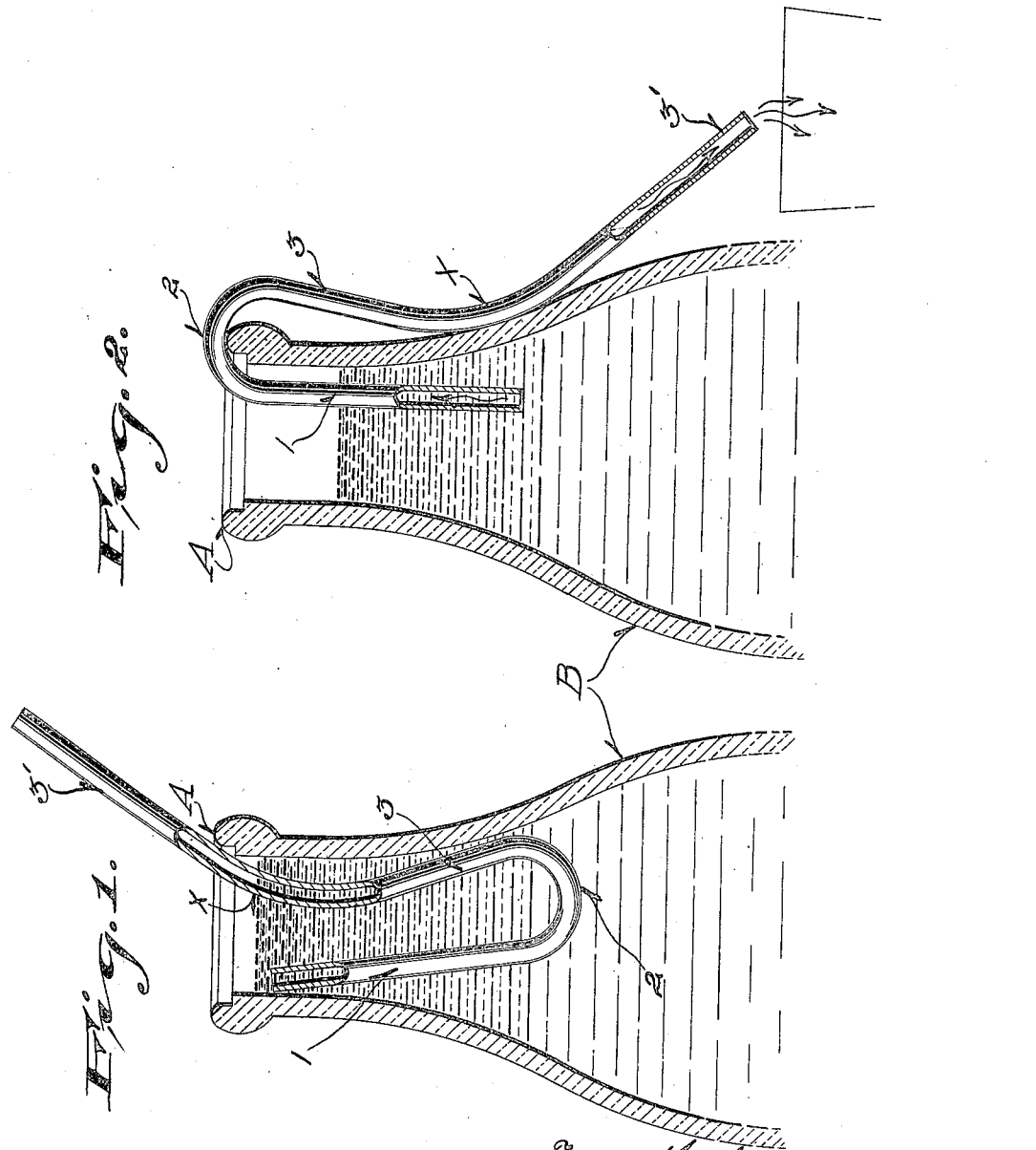
Inventors
Jacob E. Maier
Nicholas Lenz
Clarence E. Radmer Patented Feb. 13, 1923.

1,445,527

UNITED STATES PATENT OFFICE.

JACOB E. MAIER, NICHOLAS LENZ, AND CLARENCE E. RADMER, OF MILWAUKEE, WISCONSIN.

CREAM SEPARATOR FOR MILK CONTAINERS.

Application filed June 26, 1922. Serial No. 570,942.

*To all whom it may concern:*

Be it known that we, JACOB E. MAIER, NICHOLAS LENZ, and CLARENCE E. RADMER, all citizens of the United States, and residents of Milwaukee, in the county of Milwaukee and State of Wisconsin, have invented certain new and useful Improvements in Cream Separators for Milk Containers; and we do hereby declare that the following is a full, clear, and exact description thereof.

Our invention refers to cream separators and it has for its object to provide a simple siphon tube for separating the cream from original containers or bottles. The construction and arrangement of the siphon is such that it can be inverted and immersed in the neck of the bottle for receiving an initial volume of cream that will extend beyond the return bend, whereby the siphon is started when inverted for delivery purposes, the long leg of the siphon being intermediately bowed both for the purpose of preventing the siphon, when inverted, from dropping too far in the bottle, and to hold the discharged end of the siphon in its proper delivery position when in operation.

With the above objects in view, the invention consists in certain peculiarities of construction and combination of parts as set forth hereinafter with reference to the accompanying illustrations and subsequently claimed.

In the drawings,

Figure 1 represents a sectional elevation of a portion of a milk bottle, having fitted therein, an inverted siphon embodying the features of our invention, the siphon being in position to receive a predetermined filling of cream, whereby it will automatically draw off the cream when it is removed and inverted to a delivery position, and Figure 2 is a similar view showing the siphon in its delivery position.

Referring by characters to the drawing, A represents the mouth or lip of a standard milk bottle B. Referring to Figure 2 of the drawings, the siphon is shown in its cream delivery position, with relation to the bottle contents, and the short leg of the siphon is of a length approximately equal to the depth of the cream contained in the bottle. The short leg of the siphon is merged into a return bend or throat 2, which throat rests upon the lip of the bottle and the long or discharge leg 3 of the siphon, is bowed inwardly or towards the straight leg 1 intermediate of its length, as indicated at X. The bowed intermediate portion X of the long leg engages the side walls of the bottle and forms a rest for the siphon, whereby it will assume its proper position with relation to the bottle and the discharge end 3' of the long leg of said siphon is thus positioned obliquely or flared outwardly from the side wall of the bottle, whereby a clearance between the bottle and the discharge mouth of said leg is of sufficient distance to permit clearance between the associated wall of the bottle for placing a cream receiving container under the mouth 3' of said leg.

In the operation of the device, for sanitary reasons, the siphon is started by simply inverting it and dropping the inverted short leg and the upper portion of the bowed long leg into the mouth of the bottle, the intermediate bowed portion X being so proportioned with relation to the entrance of the short leg that the siphon will, in a standard mouth bottle, drop the required distance into the neck to receive a column of cream which is of sufficient volume to start the siphon in a discharging action when it is reversed, as shown in Figure 2 of the drawings. After the initial column has entered a portion of the short leg and portion of the long leg of the siphon, the operator may close the discharge end or mouth of the siphon leg 3 by the thumb or any suitable closure, whereby the column of cream, partly filling the siphon, will remain intact momentarily, while said siphon is being inverted to assume a position shown in Figure 1 with relation to the bottle. Thus the siphon is started automatically and it will discharge approximately the entire body of cream from the upper portion of the milk, which bottle of cream would automatically rise and assume a depth in the neck of the bottle, as indicated in the drawing.

The siphon is preferably formed from glass, for sanitary reasons, but it may be formed from other materials, if desired, such an aluminum or metal. The siphon may be made flexible to facilitate its proper shaping and its insertion into the bottle. Owing to the fact that there are no obstructions or detachable parts associated with the siphon, it can be readily sterilized, and of course the manufacture is consequently reduced to a minimum, whereby it can be sold to the trade for a comparatively small sum.

Briefly, the invention meets the requirements of a device of this character for all household purposes.

We claim:

A siphon for removing cream from milk bottles comprising a short arm and a long arm; said arms being joined by a continuous semi circular bend; said bend being adapted to rest upon the lip of the bottle with said short arm downwardly and inwardly directed; said long arm having a second bend therein adapted to rest on the neck of the bottle, the end of said long arm being outwardly directed from said second bend for feeding liquid outwardly into a container; said first mentioned bend being of such dimension and said arms being so adjacent as to permit the insertion of said first mentioned bend into the bottle for charging the siphon.

In testimony that we claim the foregoing we have hereunto set our hands at Milwaukee in the county of Milwaukee and State of Wisconsin.

JACOB E. MAIER.
NICHOLAS LENZ.
CLARENCE E. RADMER.